US008620692B2

(12) United States Patent
Collopy et al.

(10) Patent No.: US 8,620,692 B2
(45) Date of Patent: Dec. 31, 2013

(54) INSURANCE VISIBILITY

(75) Inventors: Fred Collopy, Cleveland Heights, OH (US); Craig Allen Nard, Shaker Heights, OH (US); Himanshu S. Amin, Solon, OH (US); Gregory Turocy, Moreland Hills, OH (US); Seyed Vahid Sharifi Takieh, Broadview Heights, OH (US); Ronald Charles Krosky, Lakewood, OH (US); David Noonan, Webster Groves, MO (US); Gustavo Arnaldo Narvaez, Solon, OH (US); Brian Asquith, Cleveland Heights, OH (US)

(73) Assignee: Great Lakes Incubator, LLC, Beachwood, OH (US)

( * ) Notice: Subject to any disclaimer, the term of this patent is extended or adjusted under 35 U.S.C. 154(b) by 475 days.

(21) Appl. No.: 12/612,958

(22) Filed: Nov. 5, 2009

(65) Prior Publication Data

US 2010/0131305 A1    May 27, 2010

Related U.S. Application Data

(60) Provisional application No. 61/118,400, filed on Nov. 26, 2008.

(51) Int. Cl.
*G06Q 40/00* (2012.01)
(52) U.S. Cl.
USPC ................................................ 705/4; 705/35
(58) Field of Classification Search
USPC ....................................... 705/4, 35
See application file for complete search history.

(56) References Cited

U.S. PATENT DOCUMENTS

| 5,548,273 A | 8/1996 | Nicol et al. |
| 5,797,134 A | 8/1998 | McMillan et al. |
| 5,852,811 A | 12/1998 | Atkins |
| 5,918,180 A | 6/1999 | Dimino et al. |
| 5,964,821 A | 10/1999 | Brunts et al. |
| 6,064,970 A | 5/2000 | McMillan et al. |
| 6,456,207 B1 | 9/2002 | Yen et al. |
| 6,456,982 B1 | 9/2002 | Pilipovic |
| 6,502,020 B2 * | 12/2002 | Lang ........................... 701/31.4 |
| 6,594,635 B1 | 7/2003 | Erlanger |
| 6,615,187 B1 | 9/2003 | Ashenmil et al. |

(Continued)

FOREIGN PATENT DOCUMENTS

| JP | 2002318844 | 10/2002 |
| WO | 2007008159 A2 | 1/2007 |

OTHER PUBLICATIONS

Crichton, Katherine; "Operator safety gets a welcome lift"; Manufacturer's Monthly; May 2007.*

(Continued)

*Primary Examiner* — Edward Chang
(74) *Attorney, Agent, or Firm* — Turocy & Watson, LLP

(57) ABSTRACT

Dynamic insurance rate adjustments are communicated to a vehicle operator in order to allow the vehicle operator to adjust various parameters before an actual change to an insurance rate is communicated to a service provider or trusted third party. The various parameters can be external parameters and/or internal parameters and further can include historical information, current information, and/or predicted information. Communicating the insurance rate adjustments provides for insurance visibility for both the operator and passengers of the vehicle. The insurance rate adjustment is communicated though a device located within a vehicle to enable perception by a vehicle occupant.

19 Claims, 9 Drawing Sheets

(56) References Cited

U.S. PATENT DOCUMENTS

| | | |
|---|---|---|
| 6,868,386 B1 | 3/2005 | Henderson et al. |
| 7,010,289 B2 | 3/2006 | Jijina et al. |
| 7,142,962 B1 | 11/2006 | Pflieger et al. |
| 7,174,171 B2 | 2/2007 | Jones et al. |
| 7,395,219 B2 | 7/2008 | Strech |
| 7,469,215 B2 | 12/2008 | Kwan |
| 7,567,914 B2 | 7/2009 | Bonissone et al. |
| 7,698,158 B1 | 4/2010 | Flagg |
| 7,734,525 B2 | 6/2010 | Zborovskiy et al. |
| 7,827,046 B2 | 11/2010 | Conner et al. |
| 7,865,378 B2 | 1/2011 | Gay |
| 7,937,278 B1 | 5/2011 | Cripe et al. |
| 8,024,112 B2 | 9/2011 | Krumm et al. |
| 8,090,598 B2 | 1/2012 | Bauer et al. |
| 8,140,358 B1 | 3/2012 | Ling et al. |
| 2002/0026334 A1 | 2/2002 | Igoe |
| 2002/0046207 A1* | 4/2002 | Chino et al. .................... 707/3 |
| 2002/0065687 A1 | 5/2002 | Onoue |
| 2002/0069157 A1 | 6/2002 | Jordan |
| 2002/0095317 A1 | 7/2002 | McCabe |
| 2002/0097193 A1 | 7/2002 | Powers |
| 2002/0116228 A1 | 8/2002 | Bauer et al. |
| 2003/0050825 A1 | 3/2003 | Gallivan et al. |
| 2003/0058842 A1 | 3/2003 | Bud |
| 2003/0093304 A1 | 5/2003 | Keller et al. |
| 2003/0177140 A1 | 9/2003 | Debard et al. |
| 2003/0220835 A1 | 11/2003 | Barnes et al. |
| 2003/0224854 A1 | 12/2003 | Joao |
| 2004/0039609 A1 | 2/2004 | Burkitt |
| 2004/0143378 A1 | 7/2004 | Vogelsang |
| 2004/0153362 A1* | 8/2004 | Bauer et al. .................... 705/10 |
| 2004/0160327 A1 | 8/2004 | Kusano |
| 2005/0049765 A1 | 3/2005 | Chetia et al. |
| 2005/0071202 A1 | 3/2005 | Kendrick |
| 2005/0099279 A1 | 5/2005 | Forbes et al. |
| 2005/0156726 A1 | 7/2005 | Rubel |
| 2005/0243558 A1 | 11/2005 | Van Duyn |
| 2006/0053038 A1 | 3/2006 | Warren et al. |
| 2006/0074724 A1 | 4/2006 | Schwartz et al. |
| 2006/0212195 A1 | 9/2006 | Veith et al. |
| 2006/0229940 A1 | 10/2006 | Grossman |
| 2006/0286989 A1 | 12/2006 | Illion |
| 2007/0027726 A1 | 2/2007 | Warren et al. |
| 2007/0050248 A1 | 3/2007 | Huang et al. |
| 2007/0208497 A1 | 9/2007 | Downs et al. |
| 2007/0208751 A1 | 9/2007 | Cowan |
| 2007/0239992 A1 | 10/2007 | White et al. |
| 2007/0257804 A1 | 11/2007 | Gunderson et al. |
| 2008/0064446 A1 | 3/2008 | Camp et al. |
| 2008/0077451 A1 | 3/2008 | Anthony et al. |
| 2008/0126138 A1 | 5/2008 | Cherney et al. |
| 2008/0147245 A1 | 6/2008 | Koepf et al. |
| 2008/0154714 A1 | 6/2008 | Liu et al. |
| 2008/0228605 A1 | 9/2008 | Wang |
| 2008/0243558 A1 | 10/2008 | Gupte |
| 2008/0252412 A1 | 10/2008 | Larsson et al. |
| 2008/0255888 A1 | 10/2008 | Berkobin et al. |
| 2008/0294302 A1 | 11/2008 | Basir |
| 2008/0299900 A1 | 12/2008 | Lesyna et al. |
| 2008/0319602 A1 | 12/2008 | McClellan et al. |
| 2009/0024273 A1 | 1/2009 | Follmer et al. |
| 2009/0024419 A1 | 1/2009 | McClellan et al. |
| 2009/0024420 A1 | 1/2009 | Winkler |
| 2009/0030853 A1 | 1/2009 | De La Motte |
| 2009/0037230 A1 | 2/2009 | Tracy et al. |
| 2009/0063201 A1 | 3/2009 | Nowotarski et al. |
| 2009/0077229 A1 | 3/2009 | Ebbs et al. |
| 2009/0082948 A1 | 3/2009 | Hiruta et al. |
| 2009/0109037 A1 | 4/2009 | Farmer et al. |
| 2009/0287499 A1 | 11/2009 | Link et al. |
| 2010/0057556 A1 | 3/2010 | Rousso |
| 2010/0063850 A1 | 3/2010 | Daniel et al. |
| 2010/0094482 A1* | 4/2010 | Schofield et al. ................ 701/2 |
| 2010/0100485 A1 | 4/2010 | Haddy |
| 2010/0153137 A1 | 6/2010 | Rao et al. |
| 2010/0205012 A1 | 8/2010 | McClellan et al. |
| 2011/0022417 A1 | 1/2011 | Rao |
| 2011/0106370 A1 | 5/2011 | Duddle et al. |
| 2011/0161232 A1 | 6/2011 | Brown et al. |
| 2011/0294520 A1 | 12/2011 | Zhou et al. |

OTHER PUBLICATIONS

Baxter, James J.; Most U.S. Speed restrictions are recklessly low: [Final/Sports final/All Edition]; The plain Dealer; Jul. 24, 1993.*
Ho, et al. "Integrating Intelligent Driver Warning Systems: Effects of Multiple Alarms and Distraction on Driver Performance." Transportation Research Board 85th Annual Meeting Compendium CD-ROM, Washington, D.C., 2006, 16 pages.
Gregory Seay, CT firm seeks to market safe-driving. http://www.hartfordbusiness.com/news8988.html, Last accessed May 20, 2009, 1 page.
OA dated Jul. 11, 2011 for U.S. Appl. No. 12/490,033, 50 pages.
Ref. U—Ho, et al., Integrating Intelligent Driver Warning Systems: Effects of Multiple Alarms and Distraction on Driver Performances, TRB 2006 Annual Meeting, Submitted on Jul. 31, 2005 and Revised on Nov. 15, 2005 (pp. 1-16).
OA dated Jun. 28, 2011 for U.S. Appl. No. 12/536,999, 25 pages.
OA dated Jul. 22, 2011 for U.S. Appl. No. 12/395,342, 65 pages.
International Search Report and Written Opinion dated Mar. 19, 2010 for PCT Application Serial No. PCT/US2009/065730, 13 pages.
OA dated Dec. 9, 2011 for U.S. Appl. No. 12/624,371, 34 pages.
OA dated Jan. 31, 2012 for U.S. Appl. No. 12/490,033, 65 pages.
OA dated Jan. 31, 2012 for U.S. Appl. No. 12/536,999, 25 pages.
OA dated Feb. 23, 2012 for U.S. Appl. No. 12/395,342, 30 pages.
OA dated Aug. 18, 2011 for U.S. Appl. No. 12/498,446, 55 pages.
OA dated Oct. 13, 2011 for U.S. Appl. No. 12/547,800, 22 pages.
OA dated Oct. 28, 2011 for U.S. Appl. No. 12/624,366, 25 pages.
OA dated Aug. 23, 2012 for U.S. Appl. No. 12/395,342, 38 pages.
OA dated Nov. 8, 2012 for U.S. Appl. No. 12/624,366, 26 pages.
OA dated Nov. 2, 2012 for U.S. Appl. No. 13/529,866, 34 pages.
Notice of Allowance dated May 25, 2012 for U.S. Appl. No. 12/624,371, 23 pages.
OA dated Mar. 19, 2012 for U.S. Appl. No. 12/498,446, 59 pages.
OA dated Apr. 12, 2012 for U.S. Appl. No. 12/624,366, 31 pages.
Office Action dated Feb. 14, 2013 for U.S. Appl. No. 12/395,342, 32 pages.
Office Action dated Feb. 15, 2013 for U.S. Appl. No. 12/547,800, 48 pages.
Chuck Rodgers, "Reporting from the Scene: Automated Crash Documentation ," GPS World, Jul. 2003, pp. 34-41.
Office Action dated Apr. 11, 2013 for U.S. Appl. No. 12/624,366, 25 pages.
Notice of Allowance dated Mar. 7, 2013 for U.S. Appl. No. 13/529,866, 19 pages.
Office Action dated May 10, 2013 for U.S. Appl. No. 12/490,033, 62 pages.
Office Action dated Sep. 13, 2013 for U.S. Appl. No. 12/490,033, 62 pages.
Office Action dated Sep. 27, 2013 for U.S. Appl. No. 12/395,342, 39 pages.
Office Action dated Aug. 14, 2013 for U.S. Appl. No. 12/547,800, 40 pages.
Non-Final Office Action dated Sep. 12, 2013 for U.S. Appl. No. 12/624,366, 35 pages.

* cited by examiner

INSURANCE VISIBILITY

CROSS-REFERENCE TO RELATED APPLICATIONS

This application claims priority to U.S. Provisional Application Ser. No. 61/118,400, filed on Nov. 26, 2008, entitled "INSURANCE OPTIMIZER AND REAL TIME ANALYTICS," the entirety of which is incorporated herein by reference.

BACKGROUND

Insurance coverage is a commodity that many people purchase for peace of mind and/or because local laws require such coverage. Thus, most people might consider insurance as something that is necessary and, at times, undesirable due to insurance premiums. Additionally, at least some consumers are not loyal to a particular insurance provider and might purchase insurance from a lowest cost provider in an attempt to save money. These cost conscious consumers might shop around for insurance to find lower rates, which such consumers can obtain in exchange for a reduction in the coverage amount for each occurrence and/or the type of coverage purchased. Further, it is almost impossible to determine (without specifically asking the question) whether an individual has insurance and the name of the insurance carrier. Thus, if a person asks to be driven to another location, that person might be in a vehicle that does not have insurance coverage, which can result in excessive expenses if an accident occurs during the trip. Therefore, as a passenger in a vehicle (or as another person that can suffer loss (e.g., bodily damage, property damage, and so forth) caused by the driver), it can be less than obvious whether damages resulting from an accident will be, at least partially, covered by insurance.

The automobile insurance industry has been exploring ways in which it can take advantage of information about a vehicle's location, conditions of operation, and other factors, to assess risk dynamically and thereby adjust insurance rates. Some devices collect and integrate information related to a vehicle. These devices are used as black boxes that operate outside the user's visual awareness or that provide feedback through web pages or Global Positioning System (GPS) displays. This black box approach renders the service invisible to the insurance consumer and/or is only communicated to the consumer when bills are generated or when the consumer accesses a particular web page for the information. Further, if feedback is provided through web pages or GPS displays, there is additional complexity that adds a new set of controls to the various controls the driver must already contend with, thereby relegating the use of feedback to times when the operator is not actually driving in order to not increase the prospects of driver distraction.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with optimizing insurance from the perspective of both the insurance provider and the insurance purchaser. According to an aspect, real time (or near real time) analytics is utilized to selectively provide information related to a potential adjustment to insurance premiums, coverage, and other parameters.

An aspect relates to summarizing information related to insurance and rendering the information in the form of an attractive and simple device. The device can emit a soft glow reflecting the safety, cost, environmental impact, or other factors, of a current driving situation. In accordance with some aspects, the device can provide the indications of the current driving situation in any perceivable format, including visual format and audio format. Further, the disclosed aspects have the added benefit of making the insurance carrier visible to the driver and passengers of the vehicle. The disclosed aspects can further relate to a vehicle operator complying with requirements of a single insurance company to maintain current insurance rates and/or to lower (or in some cases increase) an insurance rate (e.g., a surcharge or a discount is applied to a base rate).

An aspect relates to a system for enabling visibility of insurance. The system includes a monitoring component that gathers one or more parameters that can have an influence on a base rate of insurance. The system also includes an adjustment component that selectively modifies the base rate of insurance to produce a modified insurance cost (e.g., in the form of a surcharge, or discount) as a function of the one or more parameters. Further, system includes a render component that dynamically outputs the surcharge or the discount to an operator of the vehicle while the vehicle is in operation.

Another aspect relates to a method that facilitates providing visibility of a cost of insurance. The method includes gathering one or more parameters related to a vehicle covered by an insurance policy and selectively modifying the cost of the insurance policy as a function of the one or more parameters. The method also includes presenting the modified cost of the insurance policy to an operator of the vehicle.

In accordance with another aspect is a system that provides insurance visibility. The system includes means for obtaining one or more parameters associated with an insured vehicle and means for utilizing the one or more parameters to modify an insurance cost of the insured vehicle. The system also includes means for outputting the modified insurance cost, a comparison between an original insurance cost and the modified insurance cost, and the one or more parameters to an operator of the insured vehicle while the insured vehicle is in operation. In accordance with some aspects, system includes means for engaging the operator of the insured vehicle in a dialogue, associated with the modified insurance cost, wherein, based on the dialogue, the means for utilizing the one or more parameters to modify the insurance cost of the insured vehicle applies a further modification to the insurance cost. According to some aspects, the means for utilizing the one or more parameters to modify the insurance cost of the insured vehicle increases the insurance cost or decreases the insurance cost as a function of whether the one or more parameters tend to increase or decrease an amount of insurance claims.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the draw-

DETAILED DESCRIPTION

Figure 1:
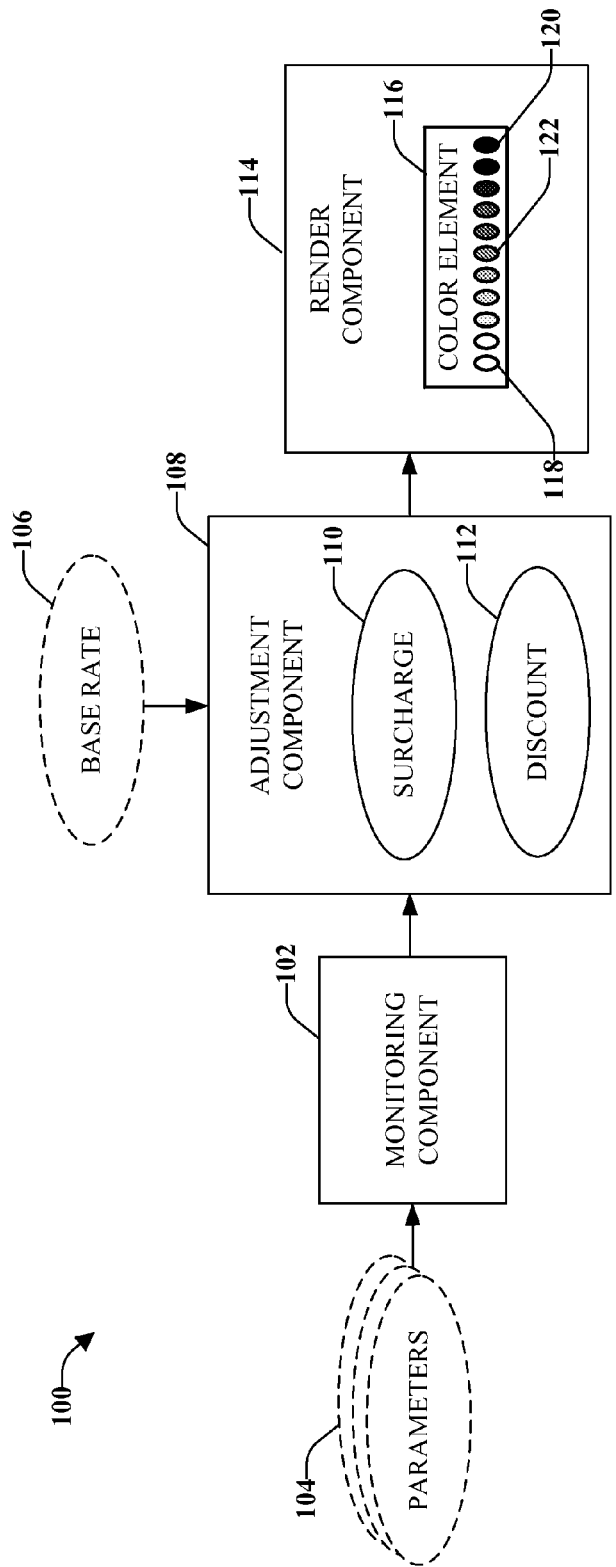
FIG. 1 illustrates an insurance visibility system, according to an aspect.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, and so forth) can be employed in connection with performing automatic and/or inferred action in connection with the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Referring initially to FIG. 1, illustrated is an insurance visibility system 100, according to an aspect. It should be noted that while various aspects presented herein are discussed with reference to a car, the various aspects can be applied to other vehicles including, but not to limited trucks, vans, motor homes, busses, motorcycles, commercial vehicles, water vehicles, aircraft, and so on. System 100 is configured to convert (vehicle) insurance from a commodity to something that has visibility and associated prestige. Insurance provider information and/or insurance rates can be rendered to the driver and/or passengers through an interactive display or through other means, such as audio (e.g., through speakers installed in the car, over a cell phone, and so on).

In an example, a dashboard-mounted display can be provided to output the name of the insurance coverage provider and/or base rate of insurance (e.g., cost of insurance at the start of a trip). As the vehicle is being operated, the base rate can be dynamically modified such that a driver (and passenger(s)) can automatically perceive the impact that one or more parameters have on the base rate. The impact can be a positive impact (e.g., discount applied for "good" behavior) or a negative impact (e.g., surcharge applied due to dangerous behavior/conditions). The parameters can relate to operating conditions, such as weather (e.g., rain, snow, icy road conditions, and so on), road congestion, construction, and so forth. Other parameters can relate to driver behavior (e.g., obeying traffic laws, speeding, tailgating, operation of a mobile device while talking on a mobile telephone, and so on) and/or location of the vehicle (e.g., parked in a garage, parked in an area known for high car thefts/damage, traveling through a high (or low) accident area, and so forth).

As the base rate of insurance is changed, the driver (and others in the vehicle) can automatically see the changes. Thus, in real-time (or near real-time) the driver can see that (while speeding, for example) his average insurance premium can be increased from eight cents a mile to thirty cents a mile (e.g., a surcharge applied). As the driver slows down, the insurance premium can automatically lower back to eight cents a mile (or a different value or cost measurement). In this way, the driver might change his behavior in order to have a lower premium (or for no surcharge applied to the base rate). Further, in accordance with some aspects, a discount can be obtained in exchange for allowing the insurance provider (or a third party) to monitor parameters associated with the vehicle.

The dynamic presentation of insurance coverage costs can function as meter-based insurance rates, which is similar to electricity modeling. The premise of electricity modeling is that when consumers are asked whether they would like to be charged for electricity based on their own (family) usage or based on the average cost of the amount of electricity their neighbors are using (e.g., statistical averaging), the consumer might select to be charged based on their own usage. When then asked whether the consumer would like to be charged based on their own driving behavior or the behavior of similar drivers (e.g., age, location, occupation, and so forth), the consumers might prefer to be charged based on their own behavior (and realize that the structure for current insurance rate charges are less than ideal). Thus, prestige or other benefits can be associated with allowing an insurance carrier (or other trusted third party) to gather information automatically in exchange for potential lower premiums and/or other benefits.

System 100 includes a monitoring component 102 that is configured to gather one or more parameters 104 that can affect a base rate 106 of insurance. One or more parameters 104 can be driving behavior, operating conditions, location, or combinations thereof. Further, the one or more parameters 104 can include an intensity portion, a frequency portion, or combinations thereof. Intensity portion and/or frequency portion can represent severity and regularity of driving episodes (e.g., slamming on brakes, gradual/sudden deceleration, velocity variances, and so forth).

The one or more parameters 104 can be gathered by monitoring component 102 in a number of manners. For example, sensors or other data gathering components can be operatively connected to the vehicle to obtain both external and internal (to the vehicle) operating conditions. Monitoring component 102 can selectively interact with the sensors and/or other data gathering components to obtain information that might have an influence on the base rate 106.

In another example, monitoring component 102 can interact with other systems to obtain one or more parameters 104. For example, monitoring component 102 can interact with an external traffic reporting system (or database) and, based on the current location of the vehicle in which system 100 is utilized, information related to traffic congestion, construction, and other factors of that particular location can be gathered by monitoring component 102. For example, initially, a geographic location for the vehicle can be determined by a global positioning system (GPS). This geographic location can be matched with real-time weather and/or road conditions for the determined location though a wireless network, an Internet Protocol (IP) network, and so forth, which can interact with a geographic maps server, a weather server, or the like.

Also included in system 100 is an adjustment component 108 that is configured to selectively modify the base rate 106 to provide a surcharge 110 or a discount 112. The surcharge 110 or discount 112 (or, in some cases, no change to the base rate 106) is communicated to a render component 114 that is configured to output the surcharge 110 and/or the discount 112, which can be perceived by an operator, passenger, vehicle occupant, and others.

Render component 114 can output surcharge 110, discount 112, one or more parameters 104, or other information in any perceivable format (e.g., visual, audible, and so forth). In accordance with some aspects, render component 114 outputs surcharge 110 and/or discount 112 in a visual format that illustrates the surcharge 110 or discount 112 as a bar chart, pie chart, or other chart, wherein the type of chart is configurable by the vehicle operator/or other user that has authorization to modify system 100. In accordance with some aspects, render component 114 outputs the information (e.g., surcharge 110 and/or discount 112) as a color scheme, wherein the complex information is represented along a single color dimension. Alternatively or additionally, relative brightness can be used by color element 116 to convey information related to insurance costs.

In accordance with some aspects, render component 114 can be selectively removed from vehicle and/or other components of system 100. For example, render component 114 can be integrated, at least in part, in a car's key fob, wherein the key fob can perform multiple functions. For example, the key fob can remotely start a vehicle. When the operator enters the vehicle, the key fob can be placed in a location that allows viewing of the key fob while operating the vehicle. As the vehicle is operated, the key fob can output surcharge 110, discount 112, one or more parameters 104 and/or other information though a display or through other properties of key fob (e.g., key fob constructed of translucent material).

In another example, render component 114 can be associated with a mobile device (e.g., smart phones or other device). The wireless capacity of mobile device can be utilized to communicate with other system 100 components. When an operator enters the vehicle, the mobile device can be located where a display of the mobile device can be perceived while the vehicle is in operation.

According to another aspect, render component 114 outputs information in an audible format. The audible format can be in the form of a statement (e.g., "Based on your current speed, you can be accessed a surcharge of ten percent.", "Since you have been driving the correct speed limit for the past two hours, you can expect a fifteen percent discount in your insurance base rate this month.").

In accordance with some aspects, the audible format can be in the form of a question (e.g., "Would you like to continue driving erratically for an insurance surcharge of ten dollars per week, bringing your total costs to xxx dollars per month?", "Since you have been operating your vehicle in the proper manner, would you like a rebate or would you like to apply your earned discount to your current policy and extend that policy by one month?"). Thus, the operator is made aware of one or more factors that can affect the cost of insurance and the operator's behavior (or other factors) can be changed so that the cost of insurance is affected in a positive manner for the operator.

According to some aspects, render component 114 can output the surcharge 110 and/or the discount 112 in the form of an audible signal (e.g., beep). The audible signal can be the same for both the surcharge 110 and the discount 112. However, according to various aspects, a different audible signal can be utilized depending on whether a surcharge 110 should be applied or whether a discount 112 should be applied. For example, surcharge 110 can have a tone, frequency, and so forth, that is different from the tone, frequency and so forth, utilized for the discount 112. In this manner, the operator, who has learned the different audible signals and/or configured the different audible signals, can comprehend the surcharge 110 and/or discount 112 without distracting her eyes from the road.

Further, in accordance with one or more aspects, the information (e.g., surcharge 110, discount 112) provided by render component 114 to the operator of the vehicle can be presented at a frequency that is more often than the frequency at which the information is supplied to an insurance provider and/or trusted third party. In such a manner, an actual surcharge and/or discount are not applied to the base rate at a near real-time rate, which allows the operator to modify her behavior and/or other parameters.

In accordance with some aspects, render component 114 can be configured to represent complex information along a color dimension. Render component 114 can be located in a driver's viewing range, wherein the driver can perceive render component 114 while operating the vehicle. For example, render component 114 can be placed on (or integral to) a vehicle dashboard in a manner that does not significantly distract the driver. In accordance with some aspects, render component 414 prominently displays a name of the company providing the insurance coverage and/or other information related to the insurance company (e.g., contact information).

Included in render component 114 can be a color element 116 that is configured to vary in color across a visual spectrum, wherein a first end 118 of spectrum and a second end 120 of spectrum are illustrated. Color element 116 can output at least one color across the spectrum to indicate a current insurance cost and/or a change to an insurance cost. A change in the distribution of colors produced from first end 118 to second end 120 (and from second end 120 to first end 118) is a function of the amount of increase (or decrease) in an amount of insurance. In accordance with some aspects, a decrease in the amount of insurance is indicated by a color change from first end 118 to second end 120 and an increase in the cost of insurance is indicated by a color change from second end 120 to first end 118.

In accordance with some aspects, a current cost of insurance can be represented along the spectrum, such as a center point 122. An increase (or decrease) can be represented by a color change, wherein an increase can be represented by a color movement toward first end 118 and a decrease can be represented by a color movement toward second end 120 (or vice versa).

For example, as cost of insurance increases, the output by color element 116 can progress across the spectrum from first end 118 to second end 120, wherein the progression across the spectrum is a function of the amount of increase in the cost of insurance. In another example, as a cost of insurance decreases, the output by color element 116 can change in the direction of second end 120 to first end 118.

In accordance with some aspects, color element 116 can include Light Emitting Diodes (LEDs) or other means for producing light across a hue spectrum. The LEDs or other means should vary in color across a spectrum (e.g., from red to blue, from yellow to green, from a light shade of color to a dark shade of color, from a dark shade of color to a light shade of color, and so forth).

According to some aspects, a color from a different spectrum can be utilized to indicate situations when there is no information available, not enough available information, and/or no connectivity to a central network (e.g., insurer's network, trusted third party's network). For example, while a vehicle is being driven through rural areas, there might be limited or no wireless reception, thus communication cannot be conducted with another entity (e.g., insurer's network, trusted third party's network). In this situation, a different color, such as blue, can be presented to the user to indicate that information is still being gathered and/or analyzed, but there is no information available for the driver at the current time. In accordance with some aspects, the color spectrum can indicate other parameters in addition to (or in lieu of) changes in a cost of insurance. For example, the colors can represent operating cost, environmental impact, how safely a vehicle is being operated, and/or other factors that might be of interest to the driver.

Figure 2:
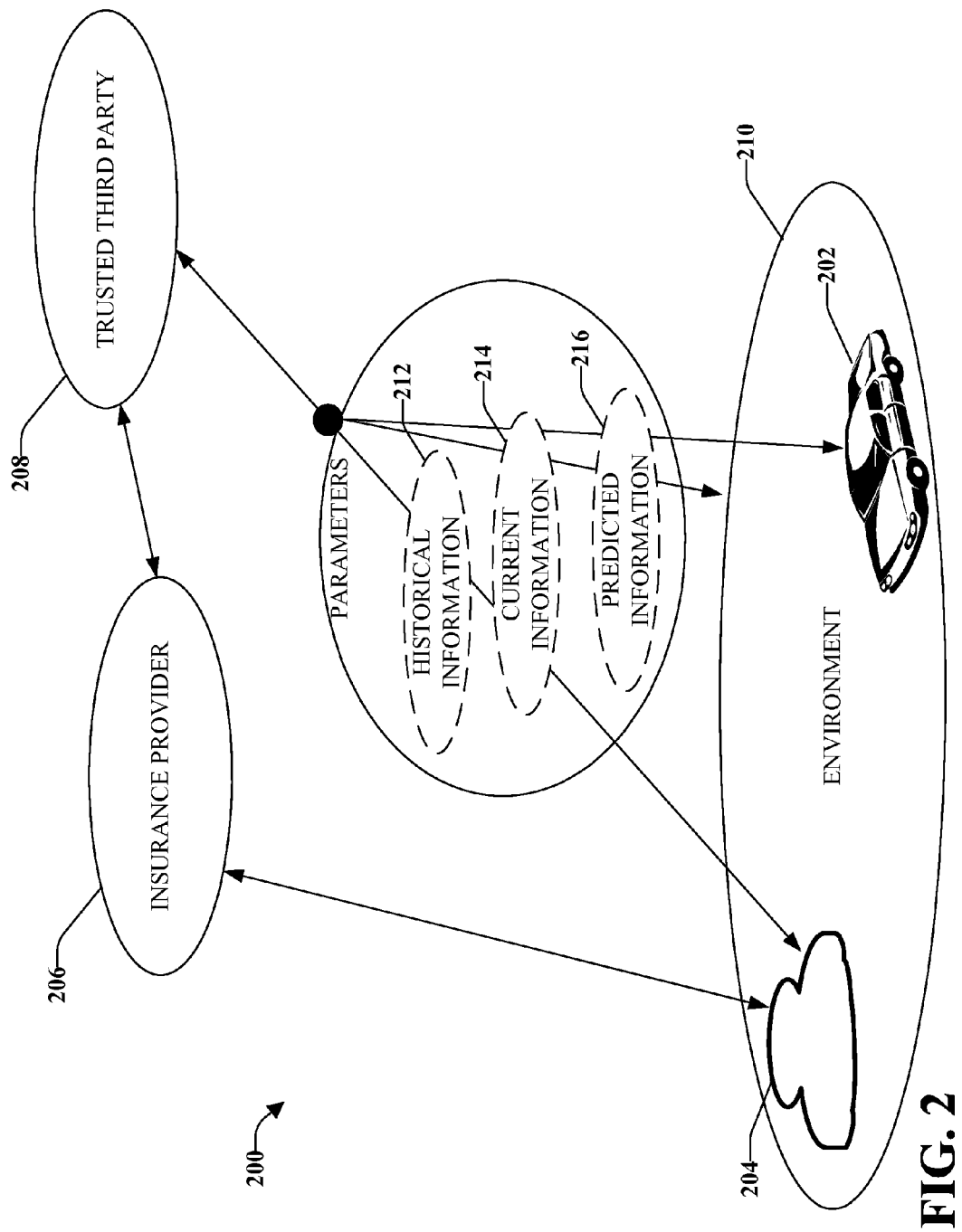
FIG. 2 illustrates a schematic representation of an environment in which the disclosed aspects can be utilized.

FIG. 2 illustrates a schematic representation of an environment in which the disclosed aspects can be utilized. Included in environment is a system 200 that includes a vehicle 202 and an operator 204 (e.g., insurance purchaser, covered individual). An operator 204 can purchase an insurance policy from an insurance provider 206. As a condition of insurance (or for a reduction in the cost of the insurance policy), operator 204 can agree to monitoring by insurance provider 206 or by a trusted third party 208. Insurance provider 206 and trusted third party 208 can be a single entity (e.g., trusted third party 208 is a subsidiary of insurance provider 206) or a separate entity (e.g., trusted third party 208 gathers information for various entities, including insurance provider 206).

Trusted third party 208 can gather information (or parameters) related to vehicle 202, operator 204, and/or an environment 210. Gathered information can be historical information 212, current information 214, and/or predicted information 216 (e.g., information that is predicted to occur in the future).

Historical information 212 can be gathered from information provided by operator 204, an automobile dealership, maintenance garages, oil change centers, or other entities that have serviced vehicle 202 and/or from which products/services for vehicle 202 have been purchased. In accordance with some aspects, historical information 212 is retrieved from a credit card company, a debit card company, and the like (e.g., based on where purchases were made or based on what was purchased an inference is made that the purchase is for the vehicle 202). It should be understood that prior to any information being gathered from any entity, the operator 204 should specifically authorize the gathering of data. Such historical information 212 can provide indications of the safety of the vehicle based on services performed on the vehicle.

Additionally or alternatively, historical information 212 can relate to conditions associated with similar vehicles. For example, information related to problems associated with a vehicle (e.g., similar make, model, and year) that might cause an accident or other property damage can be gathered from others over time (e.g., other individuals, based on other insurance claims, statistics, or other data gathered by government agencies, and so forth). In an example, if there is a defect found associated with a particular type of vehicle, this defect, unless corrected, might have an impact on the vehicle insurance. Thus, historical information 212 can be utilized to determine whether an insurance amount should be adjusted (e.g., a surcharge applied if not corrected, no change to base rate if corrected, and so forth).

Current information 214 can be gathered in real-time (or close to real-time rates) as vehicle 202 is operated or at other times (e.g., when vehicle 202 is not in operation). Current information 214 can be operating conditions and/or an operating environment 210. For example, current information 214 can be the number of passengers in the vehicle and the identity of those passengers (e.g., friend, spouse, children, and so forth). Such information can provide information about why a vehicle is being operated in a particular manner. For example, a person might operate a vehicle more recklessly when a friend is in the vehicle as compared to how that vehicle is operated when a spouse or a child is in the vehicle. Such information can be utilized, in accordance with the disclosed aspects, to inform the operator of specific behavior patterns and how those behavior patterns affect insurance costs.

In accordance with some aspects, current information 214 relates to other vehicles/operators in environment 210 (e.g., traffic congestion levels, operating condition of other vehicles, and so on). For example, sensors can be positioned such that the presence of other vehicles is detected (e.g., through vehicle-to-vehicle communication). In another example, insurance visibility systems of adjacent vehicles (or vehicles with a certain distance) can communicate their respective presence information.

Predicted information 216 can be gathered from estimates made by trusted third party 208. For example, historical driving conditions of vehicle 202 can be analyzed and, based on this historical data, predictions about future driving conditions can be made. In another example, information related to where vehicle 202 has been historically parked overnight and/or during the day can be gathered to determine whether vehicle 202 is parked in a neighborhood that has high theft and/or vandalism rates.

As vehicle 202 is operated, trusted third party 208, can analyze all information gathered and a determination can be made related to data that should be provided to operator 204. In accordance with some aspects, the data provided to the operator 204 is for information purposes only and an actual change in an insurance premium might be based on information gathered over time (e.g., one week, two months, a year, and so forth). Thus, although dynamic insurance rates are automatically and at frequent intervals provided to the insured, the actual rate charged might take into account a longer period of time before a premium change is made. In this manner, if desired, a vehicle operator can change certain behaviors before there is an actual change in the amount charged for insurance protection. In accordance with some aspects, a device within the vehicle 202 can perform the computations and/or determine any surcharge/discount locally.

Figure 3:
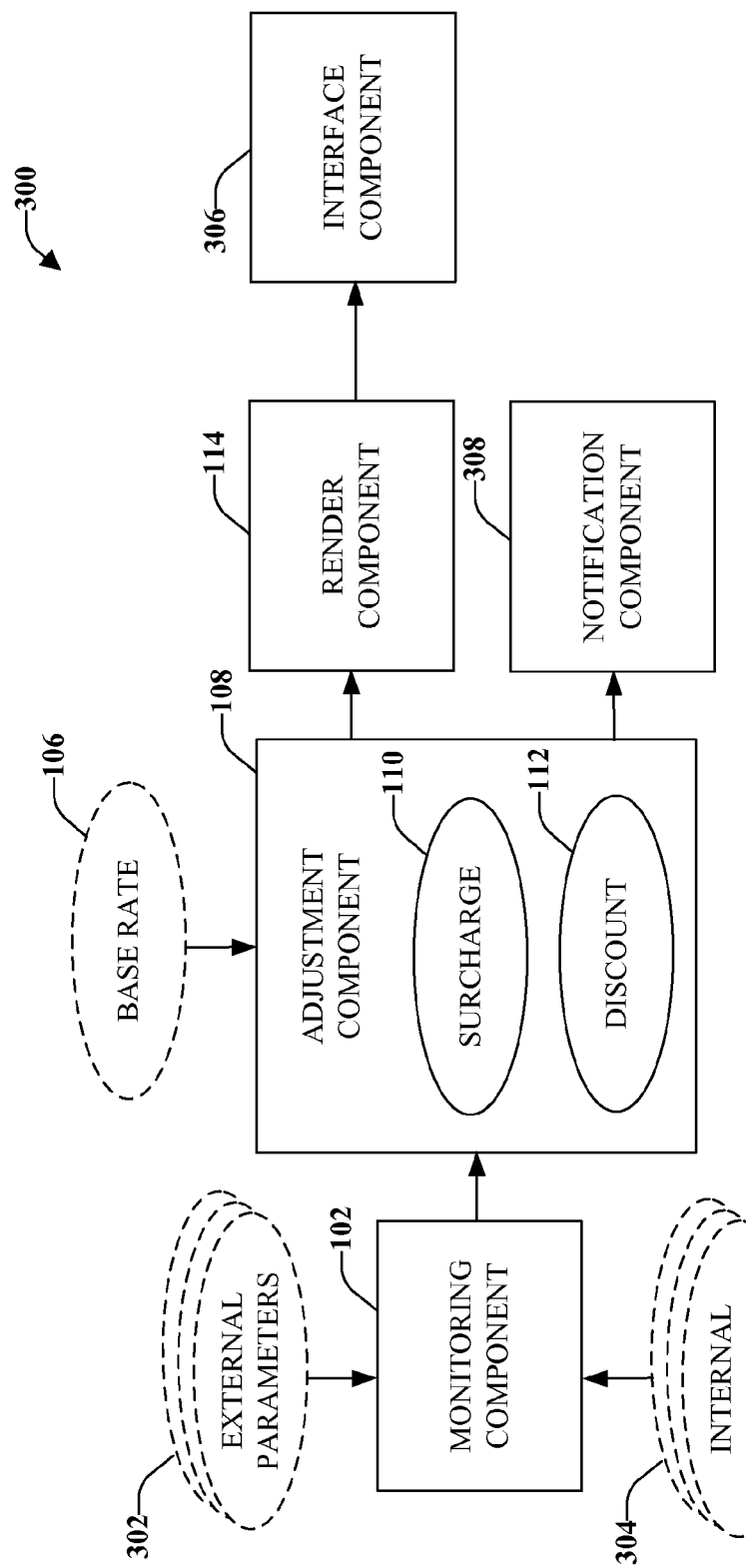
FIG. 3 illustrates a system for actively involving an insured with respect to automatic changes to an insurance premium and/or coverage, in accordance with an aspect.

FIG. 3 illustrates a system 300 for actively involving an insured with respect to automatic changes to an insurance premium and/or coverage, in accordance with an aspect. System 300 includes a monitoring component 102 that is configured to monitor external parameters 302 and internal parameters 304. The external parameters 302 are those parameters that are not within the control of the insured. However, internal parameters 304 are those parameters for which the insured has at least partial control.

Monitoring component 102 can provide information related to the external parameters 302 and the internal parameters 304 to an adjustment component 108. Further, adjustment component 108 can obtain a base rate 106 of insurance. Base rate 106 can be retained internally by adjustment component 108 (e.g., retained in a storage medium) or can be dynamically obtained from an external source (e.g., insurance provider, trusted third party, and so forth). As a function of external parameters 302, internal parameters 304, and/or base rate 106, adjustment component 108 selectively produces a surcharge 110, a discount 112, or makes "no change" to base rate 106. In accordance with some aspects, adjustment component 108 applies a discount if the one or more parameters 302, 304 tends to decreases a number of insurance claims or applies a surcharge if the one or more parameters 302, 304 tends to increase the number of insurance claims.

Adjustment component 108 provides the surcharge 110, the discount 112, or an indication of "no change" to render component 114 that outputs the surcharge 110, the discount 112, or the indication of "no change" in a perceivable format. In accordance with some aspects, render component 114 is located within the vehicle to enable perception by a vehicle occupant. For example, render component 114 outputs a visual representation of the surcharge 110, the discount 112, or the indication of no change. In another example, render component 114 outputs an audible representation of the surcharge 110, the discount 112, or the indication of no change. In accordance with some aspects, render component 114 outputs additional information, such as the original insurance cost, the parameters utilized to provide the comparison, and so forth.

System 300 also includes an interface component 306 that engages a user (e.g., an operator of vehicle) in an interchange related to the surcharge 110, the discount 112, or the indication of "no change". For example, render component 114 can output one or more parameters considered by adjustment component 108 and the adjustment (e.g., surcharge 110, discount 112, indication of no changes) that might be made to an insurance cost. The user can interact with interface component 306 by adjusting her behavior (e.g., reduce speed so that she is traveling at a safer rate of speed (or at the speed limit), stop talking on her cell phone, no longer following the car in front of her too closely (e.g., as determined by breaking pattern and/or sensing equipment, and so forth)). In another example, the user can verbally interact with system 300, such as by replying negatively or positively to questions provided though interface component 306.

In another example, interface component 306 can be configured to receive a response from the operator of the vehicle based on information presented to the operator. This response can be utilized to further modify the cost of the insurance policy.

In accordance with some aspects, the vehicle operator can selectively enable or disable system 300. For example, system 300 might be disabled (e.g., no data collected) if the vehicle is going to be operated by another individual. In another example, for various reasons, monitoring might not be desired (e.g., operator is late for an appointment and will be driving aggressively). In accordance with some aspects, if system 300 is disabled for a specified period of time (e.g., more than two consecutive days), a surcharge 110 might automatically be applied (e.g., an assumption is made that the insurance purchaser no longer would like a discount for utilization of the monitoring service).

Interface component 306 can provide a graphical user interface (GUI), a command line interface, a speech interface, Natural Language text interface, and the like. For example, a GUI can be rendered that provides a user with a region or means to load, import, select, read, etc. information (e.g., surcharge 110, discount 112, external parameters 302, internal parameters 304, or other information), and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed. For example, the user can interact with interface component 306 by entering the information into an edit control.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with some aspects, system 300 includes a notification component 308 that is configured to provide the gathered internal parameters 302, the gathered external parameters 304, the surcharge 110, the discount 112, details related to an interaction with a user, or combinations thereof, to a service provider (e.g., insurance provider, trusted third party, and so on). The information can be conveyed by notification component 308 though various wireless communications technologies.

The information sent by notification component 308 can be conveyed to service provider at different intervals, which can be predefined or based on other factors. For example, information might be gathered over days or weeks and the cumulative information sent to service provider (e.g., as specified in a negotiated agreement). In accordance with some aspects, information might be sent to service provider based upon an incident occurring (e.g., detection of an accident, detection of vehicle being stolen/unauthorized use, and so on). According to some aspects, notification component 308 conveys the information to the service provider of the trusted third party less often than render component 114 dynamically outputs the surcharge 110, the discount 112, or the no change indication to the operator of the vehicle.

Figure 4:
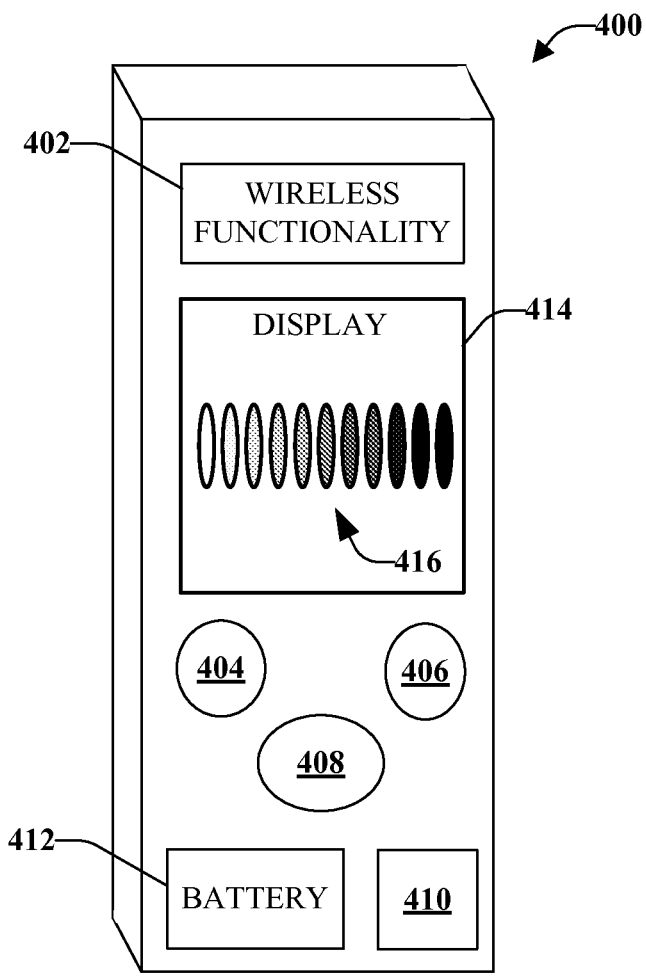
FIG. 4 illustrates a perspective view of an example device utilized in an insurance visibility system, according to an aspect.

FIG. 4 illustrates a perspective view of an example device 400 utilized in an insurance visibility system, according to an aspect. As previously discussed, an insurance visibility system can include a render component that is located within the vehicle to enable perception by a vehicle occupant. The render component can be placed on (or integral to) a vehicle dashboard in a manner that does not significantly distract the driver. In accordance with an aspect, the render component can be a device that has dual functionality. For example, illustrated is an example device 400 that can operate as a key (e.g., a key fob) and also can operate as a display for an insurance visibility system. Although device 400 is illustrated as rectangular, other geometric shapes can be utilized in accordance with the disclosed aspects.

Device 400 includes wireless functionality 402 that allows device 400 to communicate with vehicle controls, an insurance provider, and/or a trusted third party. For example, wireless functionality 402 can be utilized to allow a vehicle operator to select one or more options associated with the vehicle. These options are represented by ovals 404, 406, and 408. In an example, the options can be to lock and/or unlock doors of a vehicle, open a trunk, start the vehicle remotely, and/or other options that are desired to be controlled remote from the vehicle. Electronic functionality (e.g., chip set) is represented at 410. A battery 412 or another type of power source can also be associated with device 400.

In accordance with an aspect, device 400 can include a display 414 that is configured to output visual information to the operator. In accordance with some aspects, display 414 can include a colored LED array 416 that represents information related to increases, decreases, or no change to the cost of insurance. Colored LED array 416 can vary in color across a visual spectrum. According to some aspects, device 400 is constructed of translucent material that can provide the colored LED array 416 on the entire device 400 (e.g., there is no display 414, instead, at least a subportion of the translucent material is able to present the information in a visual manner.

According to some aspects, device 400 includes a means for attaching device to a dashboard (or other location) in a vehicle. For example, a strip of material, such as a hook and loop fastener (e.g., Velcro® or Velcro®-like material), hook tape, loop tape, or the like can be attached to a backside (or other portion) of device 400, wherein the material can connect with another material (of the same type or a different type) located on the dashboard (or other location). In another example, device 400 can include a clip that selectively engages with a mating portion associated with vehicle. However, it should be understood that these are merely examples and other means for attaching device 400 to a portion of vehicle wherein a vehicle operator can perceive device 400 can be utilized. In accordance with some aspects, the operator might simply place the device 400 on the passenger seat, on the dashboard, or in another location where the user is able to perceive any color changes.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
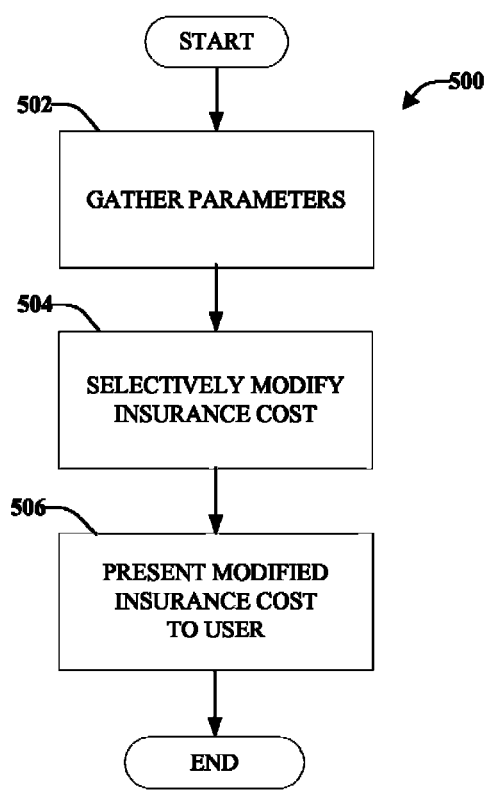
FIG. 5 illustrates a method for providing insurance visibility, according to an aspect.

FIG. 5 illustrates a method 500 for providing insurance visibility, according to an aspect. Method 500 is configured to optimize insurance from the perspective of both the insurance provider and the insurance purchaser. According to an aspect, method 500 can utilize real time analytics to selectively adjust insurance premiums, coverage, and other parameters or to provide an indication of changes that might be made if one or more parameters are not changed.

Method 500 starts, at 502, when parameters that can affect the cost of insurance are gathered. The gathered parameters can be parameters that are external to a vehicle, which might be parameters that are not controlled by the vehicle operator. External parameters include environmental conditions, such as weather conditions (e.g., thunderstorm, snowstorm, whether the vehicle is being driven into the sun (which can impair the visibility of the vehicle operator), and so forth). Other external parameters include operating conditions, which can include road conditions (e.g., icy road conditions, winding road, downhill grade of road, potholes, other hazardous driving conditions, and so forth).

Parameters gathered, at 502, can include parameters that are internal to a vehicle. These internal parameters can include internal operating conditions such as whether there are passengers in the vehicle, whether the operator is engaged in conversation (e.g., with passengers or though interaction with a mobile device (e.g., cellular telephone)), whether the driver and/or passengers are wearing safety belts, and so on.

As a function of one or more gathered parameters, at 504, the insurance cost is selectively modified (e.g., a surcharge is applied, a discount is applied). Modifying the cost of the insurance cost (e.g., insurance policy) comprises applying a discount if the one or more parameters tend to decrease a number of insurance claims or applying a surcharge if the one or more parameters tend to increase a number of insurance claims.

The modified insurance cost is presented to the user, at 506, in any perceivable format. The presentation to the user, at 506, can also summarize the information related to insurance, which can include the parameters utilized to make the determination, whether to increase or decrease a base rate, and so on. Further, the presentation can include rendering the information in the form of an attractive and simple device. For example, the device can emit a soft glow reflecting the safety, cost, environmental impact, or other factors, of a current driving situation. In another example, the device can output an audible indication of whether there will be an increase or a decrease in a base rate based on current conditions. Further, the presentation to the user (and others, such as passengers) can allow the insurance carrier to be visible to the driver and passengers of the vehicle. For example, an audible or visual presentation can include the name (and phone number) of the insurance provider and/or an advertisement for the insurance provider (or for other advertisers). In accordance with some aspects, the modified insurance cost is presented as a color element that varies in color across a spectrum to represent the surcharge or the discount.

Figure 6:
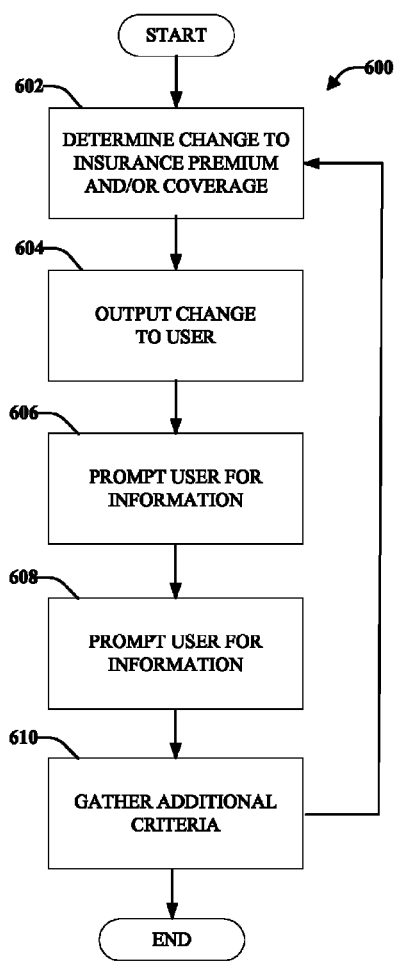
FIG. 6 illustrates a method for involving an insured in the process of determining insurance premium costs, in accordance with an aspect.

FIG. 6 illustrates a method 600 for involving an insured in the process of determining insurance premium costs, in accordance with an aspect. At 602, a change to an insurance premium and/or coverage is determined. The change can include selectively creating a modified cost of an insurance policy as a function of one or more gathered parameters. The change is output to a user, at 604, in any perceivable format. At 606, the user is prompted for information. Prompting the user (e.g., operator of the vehicle) for information can be related to the modified cost of the insurance policy, the one or more parameters, or combinations thereof. Method 600 can also include receiving a response from the operator of the vehicle, at 608.

For example, the output can include a potential change (e.g., surcharge applied, discount applied) to the cost of insurance and the parameters taken into account for this potential change. Further, the output can include a prompt such as, "Would you like this change reported to your insurance provider?", wherein the user can respond positively or negatively. In accordance with some aspects, the user can request that further data be accumulated before the change is reported to the service provider.

In accordance with some aspects, the user can provide additional information that can be taken into account when adjustments are made to the cost of insurance. For example, if a parameter gathered is incorrect, the user can provide corrected information.

Method 600 continues, at 610, with utilizing the response to further modify the cost of the insurance policy. This modification can include gathering additional criteria. The additional criteria can be external parameters, internal parameters, historical information, current information, and/or predicted information. Further, the additional criteria can be gathered over a period of time to determine whether a further adjustment to the cost of insurance should be made. Gathering such data over time can provide a more accurate reflection of the true cost of insurance. It should be noted that method 600 can continue, at 602, continuously such that any number of criteria or parameters can be gathered over time.

Figure 7:
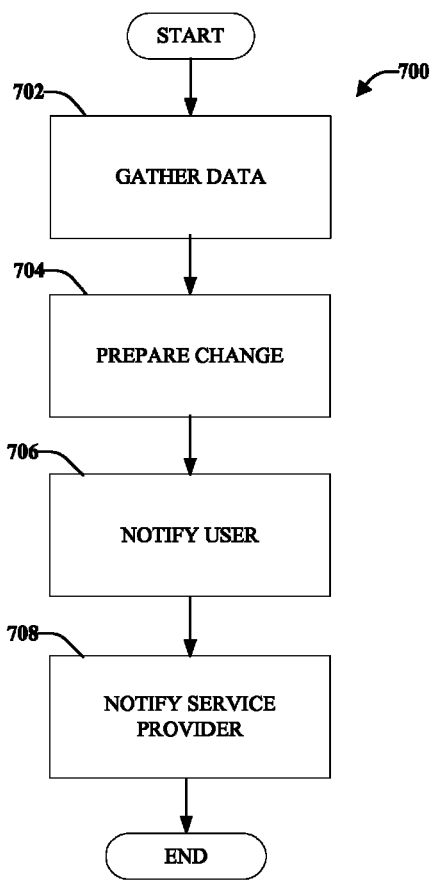
FIG. 7 illustrates a method for selectively providing insurance information to a service provider, in accordance with an aspect.

FIG. 7 illustrates a method 700 for selectively providing insurance information to a service provider, in accordance with an aspect. At 702, data is gathered. The gathered data can include external parameters and/or internal parameters. Further, the gathered data can be historical information, current information, and/or predicted information. The gathering of data can be over a period of hours, days, weeks, and so forth. Further, data gathering can be continuous, at predefined intervals, or at random intervals. In accordance with some aspects, data can be gathered while a vehicle is in operation and at other times (e.g., at two a.m. to determine where the vehicle is parked overnight).

A change to an insurance premium and/or an insurance coverage is prepared, at 704. The change is based on one or more of the gathered data, wherein each item of gathered data can have a different weight assigned. For example, data gathered related to weather conditions might be given less weight than data gathered related to user distractions (e.g., passengers, use of a mobile device while vehicle is in operation, and so forth). In another example, excessive speed might be assigned a higher weight than data related to safety performance of the vehicle. As such, data with a higher weight can be given more consideration than data with a lower weight (e.g., data assigned a higher weight can have a greater impact on the cost of insurance). Thus, if the user is traveling at (or below) the speed limit and speed is assigned a greater weight, then the safe speed will tend to decrease (or remain constant) the cost of insurance.

A user is notified of the change, at 706. The notification can be in any perceivable format. In an example, the notification is provided as a dashboard-mounted display. In another example, presenting the change can include displaying the modified cost of the insurance policy in a dashboard-mounted display and/or a heads-up display.

A service provider is notified of the change, at 708. At substantially the same time as notifying the service provider (or trusted third party) of the change, parameters taken into consideration (and associated weight) can also be provided. In such a manner, the service provider (or third party) can selectively further modify the cost of insurance, which can be communicated to the user though the vehicle display or through other means.

The service provider (or third party) might be provided the change information less often than the insurance cost change information is provided to the user. For example, the user can be provided the insurance cost change information dynamically and almost instantaneously with detection of one or more parameters that can influence the insurance cost. However, the insurance provider (or third party) might only be notified of the change after a specified interval (or based on other intervals). For example, insurance cost changes might be accumulated over a period of time (e.g., two weeks) and an average of the insurance cost changes might be supplied to insurance provider. In such a manner, the user has time to adjust parameters that tend to increase (or decrease) the cost of insurance, which allows the user to have more control over the cost of insurance.

Figure 8:
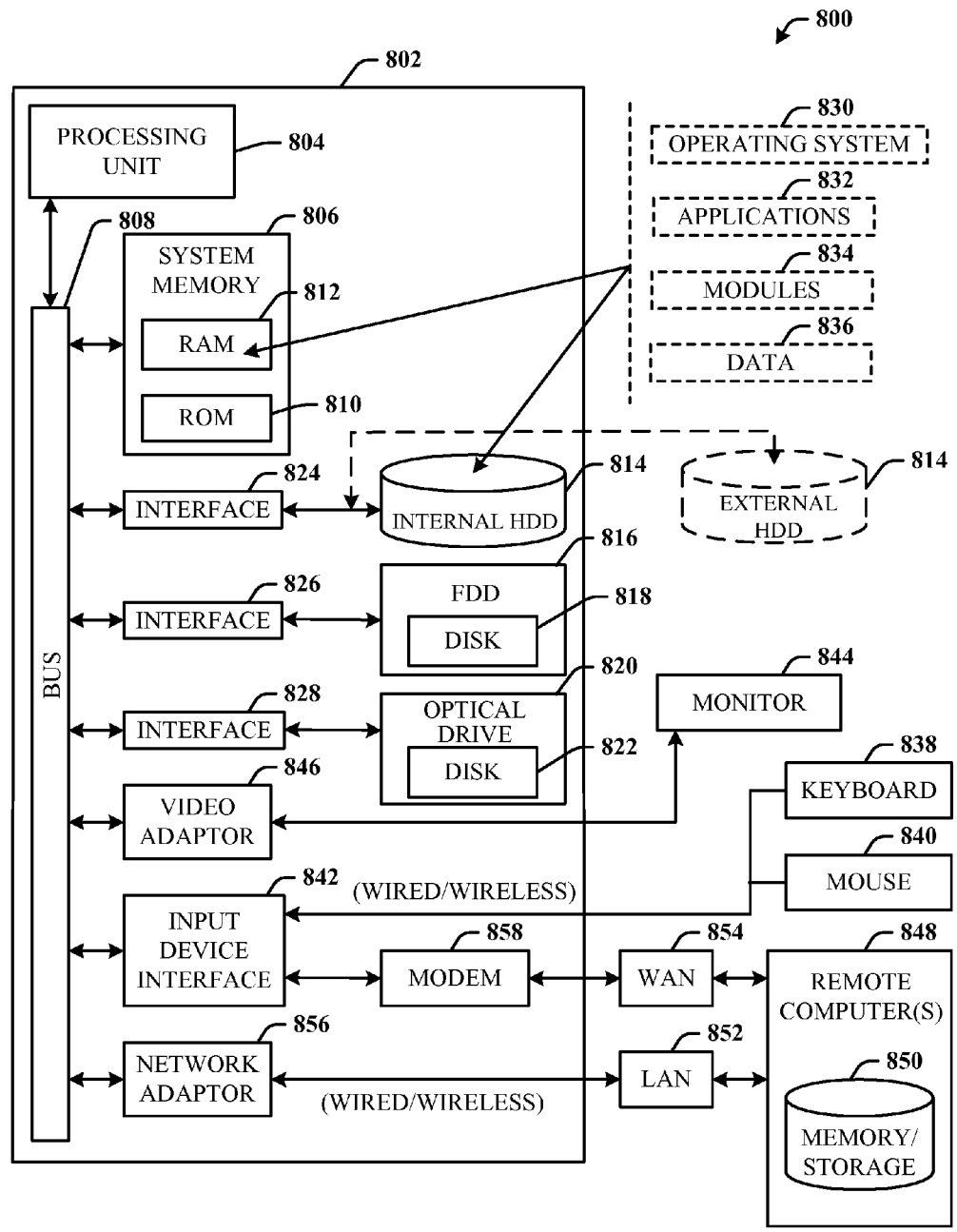
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects disclosed herein, FIG. 8 and the following discussion are intended to provide a brief, general description of a suitable computing environment 800 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A RAM memory medium can function as a data storage medium for buffering of collected data, so that data is not lost when the system bus is in use by other functions. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the various aspects can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 through an interface, such as a video adapter 846. In addition to the monitor 844, a computer typically includes other peripheral output devices (not shown), such as speakers, printers, etc.

The computer 802 may operate in a networked environment using logical connections through wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 through the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
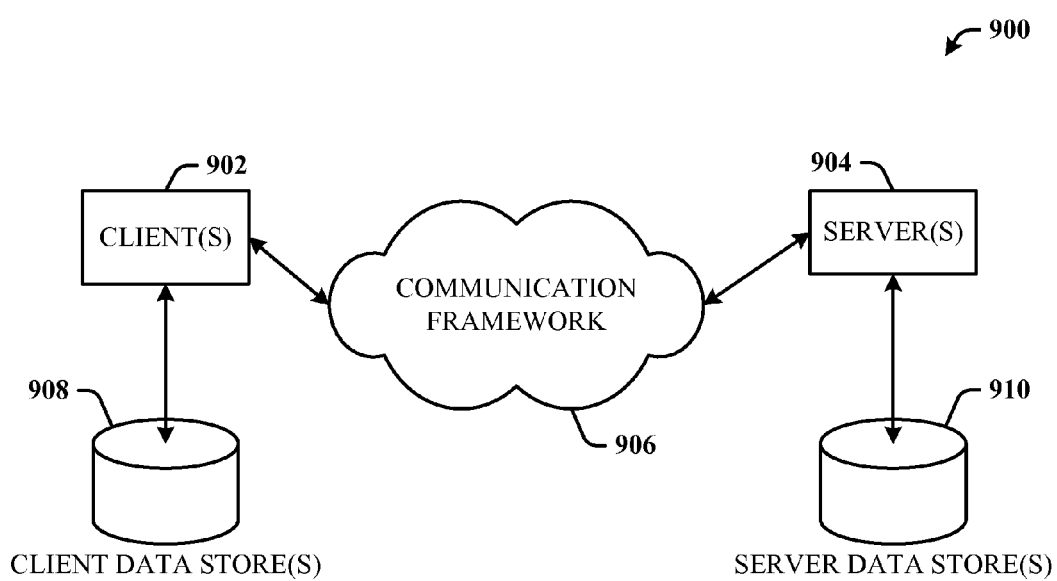
FIG. 9 illustrates a schematic block diagram of an exemplary computing environment in accordance with the various aspects.

Referring now to FIG. 9, there is illustrated a schematic block diagram of an exemplary computing environment or system 900 in accordance with the various aspects. The system 900 includes one or more client(s) 902. The client(s) 902 can be hardware and/or software (e.g., threads, processes, computing devices). The client(s) 902 can house cookie(s) and/or associated contextual information by employing the various aspects, for example.

The system 900 also includes one or more server(s) 904. The server(s) 904 can also be hardware and/or software (e.g., threads, processes, computing devices). The servers 904 can house threads to perform transformations by employing the various aspects, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated through a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising."

The term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system, comprising:
  a processor; and
  a memory that stores computer-executable components, the computer-executable components comprising:
    a monitoring component that gathers one or more parameters related to a current operation of a vehicle and at least one biofeedback data related to a current state of an operator of the vehicle;
    an adjustment component that selectively modifies, in real-time, a base rate of insurance to produce a surcharge or a discount based on the one or more parameters related to the current operation of the vehicle and the at least one biofeedback data; and
    a render component that dynamically outputs the surcharge or the discount and the one or more parameters that influenced the surcharge or the discount to the operator of the vehicle in real-time while the vehicle is in operation, wherein the render component outputs, in real-time, a visual representation of the surcharge or the discount, wherein a change to the surcharge or the discount is automatically applied to the visual representation, and wherein the render component performs a function related to the vehicle or the operator of the vehicle that is different from dynamically outputting the surcharge or the discount and wherein the render component is selectively removable from the vehicle.

2. The system of claim 1, the render component comprises a color element that varies in color across a spectrum to represent the surcharge or the discount, wherein a midpoint of the spectrum represents a current insurance cost and a change of color across the spectrum in a first direction indicates the surcharge and in a second direction indicates the discount.

3. The system of claim 1, further comprising an interface component that engages the operator in an interchange during the current operation of the vehicle, wherein the interchange is related to the surcharge, the discount, the one or more parameters, the at least one biofeedback data, or combinations thereof.

4. The system of claim 1, wherein the adjustment component produces the discount if the one or more parameters and the at least one biofeedback data tend to decrease an amount of insurance claims or produces the surcharge if the one or more parameters and the at least one biofeedback data tend to increase the amount of insurance claims.

5. The system of claim 1, wherein the render component is located within the vehicle as a dashboard mounted display or a heads-up display to enable perception by a vehicle passenger.

6. The system of claim 1, wherein the adjustment component selectively produces the discount or the surcharge in real-time to enable near instantaneous feedback to the operator as the vehicle is in operation.

7. The system of claim 1, further comprising a notification component that conveys information related to the one or more parameters related to the vehicle, the at least one biofeedback data, the discount, the surcharge, or combinations thereof, to a service provider or a trusted third party, wherein the information is conveyed to the service provider or the trusted third party less often than the render component dynamically outputs the surcharge or the discount to the operator of the vehicle.

8. A method that facilitates providing visibility of a cost of insurance, comprising:
  employing a processor to execute computer executable instructions stored in memory to perform the following acts:
    gathering one or more parameters related to a vehicle covered by an insurance policy and one or more parameters related to a vehicle operator while the vehicle is being operated;
    selectively creating, while the vehicle is being operated, a modified cost of the insurance policy as a function of the one or more parameters related to the vehicle and the one or more parameters related to the vehicle operator; and
    presenting the modified cost of the insurance policy to the vehicle operator while the vehicle is being operated, wherein the modified cost is presented in real-time in a manner that does not cause operator distraction while the vehicle is being operated,
  wherein the presenting the modified cost of the insurance policy comprises:
    outputting a plurality of lights that vary in intensity across a color spectrum, wherein a midpoint of the color spectrum represents the current cost of the insurance;
    changing an illumination of the plurality of lights in a first direction to represent a surcharge; and
    changing the illumination of the plurality of lights in a second direction to represent a discount.

9. The method of claim 8, wherein selectively modifying the cost of the insurance policy comprises applying a discount if the one or more parameters decreases a number of insurance claims or applying a surcharge if the one or more parameters increases the number of insurance claims, wherein the discount or the surcharge is represented on a sliding scale relative to the base cost of the insurance policy.

10. The method of claim 8, further comprising:
  prompting the vehicle operator for feedback related to the modified cost of the insurance policy, the one or more parameters related to the vehicle, the one or more parameters related to the vehicle operator, or combinations thereof, wherein the prompting occurs at about the same time as the gathering;

receiving a response from the vehicle operator while the vehicle is being operated; and utilizing the response to further modify the cost of the insurance policy, wherein the further modified cost is presented in real-time while the vehicle is being operated.

11. The method of claim 10, further comprising:

notifying an insurance provider or a trusted third party of the modified cost of the insurance policy, the one or more parameters, the response from the operator of the vehicle, or combinations thereof, wherein the notifying is independent from the presenting the modified cost of the insurance policy to the vehicle operator.

12. The method of claim 8, wherein the gathering the one or more parameters comprises gathering historical information, current information, predicted information, or combinations thereof.

13. The method of claim 8, further comprising:

monitoring the one or more parameters related to the vehicle and the vehicle operator, or additional parameters related to the vehicle and the vehicle operator, over time; and providing a further modification to the cost of the insurance policy based on the monitoring over time, wherein the further modification can negate a previous modification.

14. The method of claim 8, wherein presenting the modified cost of the insurance policy to the operator of the vehicle comprises displaying the modified cost of the insurance policy in a dashboard-mounted display that is selectively removable from the vehicle.

15. The system of claim 1, wherein the render component is a key fob and wherein the function is a selection of one or more options associated with the vehicle.

16. The system of claim 7, wherein the render component delays conveying the information to the service provider or the trusted third party until an event occurs that negates a previous change resulting in the surcharge or the discount.

17. The method of claim 8, further comprising:

assigning a weight to each of the gathered one or more parameters related to the vehicle and each of the one or more parameters related to the vehicle operator; and using the assigned weight to create the modified cost of the insurance policy.

18. The system of claim 1, wherein the render component is integrated in a vehicle dashboard.

19. The system of claim 2, wherein the color element comprises at least one color from a different spectrum to indicate a condition when a modified cost of insurance is not available.

* * * * *